T864010

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 15, 1969

864 O.G. 731

790,857

CURE PROMOTERS FOR TRIMETHYLPENTANEDIOL BASED UNSATURATED POLYESTERS

Arthur P. Werts and Sidney B. Miller, Jr., both of P.O. Box 511, Kingsport, Tenn. 37662

Filed Jan. 13, 1969. Published July 15, 1969
Int. Cl. C08f *1/00, 19/02*
U.S. Cl. 260—78.5
No Drawing. 4 Pages Specification

Curing system for 2,2,4 - trimethyl - 1,3 - pentanediol (TMPD) based unsaturated esters such as TMPD maleate or TMPD isophthalate, blended with monoenic compounds such as styrene or vinyl toluene having a single terminal addition polymerizable ethylenic group, comprising an addition polymerization catalyst such as benzoyl peroxide or other organic peroxides, and at least one amine curing promoter selected from the group consisting of phenyldiethanolamine, m-tolyldiethanolamine, and phenylethylethanolamine, have been found to rapidly polymerize the blend composition with a gelation time of less than about one hour, and a cure time of less than about 24 hours at temperatures below about 50° C.